Sept. 5, 1950   A. A. BOEHM, JR   2,520,904
CALCULATOR
Filed Sept. 4, 1945
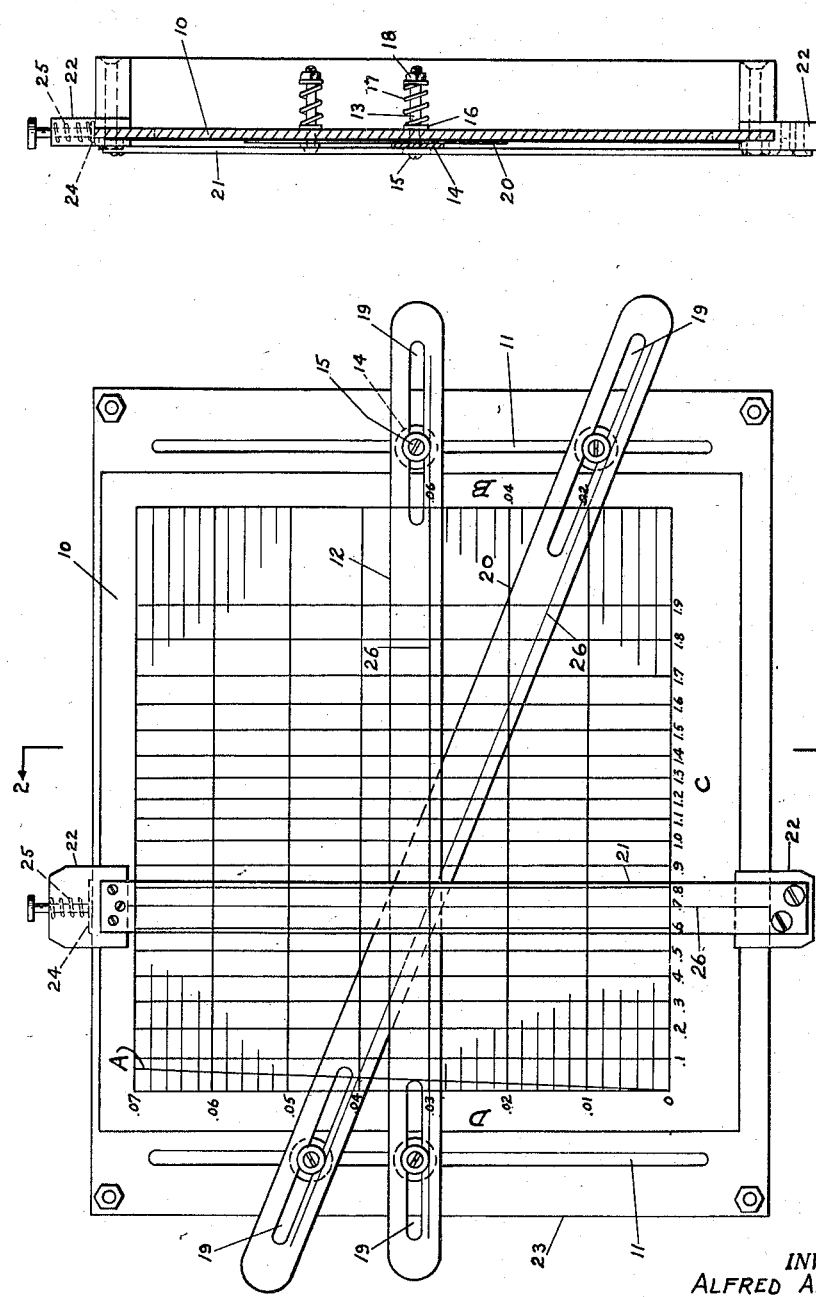
INVENTOR.
ALFRED A. BOEHM, JR.
BY
Ralph L. Chappell
ATTORNEY.

Patented Sept. 5, 1950

2,520,904

UNITED STATES PATENT OFFICE 2,520,904

CALCULATOR

Alfred A. Boehm, Jr., New York, N. Y.

Application September 4, 1945, Serial No. 614,331

6 Claims. (Cl. 235—89)

(Granted under the act of March 3, 1883, as amended April 30, 1928; 370 O. G. 757)

This invention relates to improvements in chart-holders and more particularly to a chart-holder that will aid in computing or interpreting data plotted on a chart secured to this holder.

An object of this invention is to expedite the computing of data plotted on charts.

Another object is to eliminate markings on charts so as to enable a single chart to be used for computations of different sets of data.

Further objects and advantages of this invention, as well as its construction, arrangement and operation will be apparent from the following description and claims in connection with the accompanying drawing, in which Fig. 1 is a plan view of an embodiment of the present invention; and Fig. 2 is a section taken along the line 2—2 in Fig. 1.

A rectangular board 10 of wood, light metal, plastic, or suitable composition material has parallel longitudinal slots 11 cut therein near the opposite ends of said board 10. A transparent arm 12 is secured slidably to the board 10 by bolt 13 positioned near an extremity of said transparent arm 12. The bolt 13 fits through an opening or slot 19 in the arm 12 and through one of said slots 11. A washer 14 lies between the bolt head 15 and transparent arm 12. Another washer 16 lies on the underside of the board 10 and is carried by the bolt 13, an expansion spring 17 being urged against the washer 16 by the nut 18 threaded upon the bolt 13. The second extremity of the arm 12 has a partially cut out portion or slot 19 that is secured to board 10 through the other slot 11 in a manner similar to the method for securing the first extremity of the arm 12 to the board 10.

A second transparent arm 20, like arm 12, is secured similarly to the board 10. Arm 20 is adapted to slide relative arm 12, said arm 20 crossing arm 12, as shown in Fig. 1. A third transparent arm 21 is secured at both of its extremities to a pair of runners 22 that slide along the smooth horizontal surfaces on the top and bottom of the board 10, constraining said transparent arm 21 to move along the board 10 parallel to the left edge 23 of the board 10. The runners 22 can consist of ball-bearings urged resiliently against the smooth horizontal surfaces perpendicular to board 10 or a highly polished metal plate 24 urged against one of said horizontal surfaces by a spring 25. This third transparent arm 21 is secured so as to slide over transparent arms 12 and 20. The straight lines 26, etched and blackened or colored to accentuate their presence, extend the substantial length of each of said arms.

The operation of the invention is conveniently illustrated by reference to the drawing, which shows one type of chart for which the device is applicable mounted on the board. Such a chart is used in interpreting data obtained from experimental tests performed with an impact-testing machine of the type known to those skilled in the testing art as the "Izod" machine. This machine, broadly described, consists of a swinging weight fixed through an arm at one point so as to move like a pendulum when said weight is elevated and released. The sample specimen is secured at a point corresponding to the lowest point in the swinging of said weight so as to receive the greatest force of the swinging mass. This impact test, used for purposes of illustration, is devised to determine the relative resistance to breakage of various materials.

The weight is first allowed to fall from an initial starting point without the test specimen in position. A pointer, secured to the axis of the pendulum or swinging weight, rises a given distance in response to the maximum height of a single swing of said pendulum. The value read from the scale mounted behind the pointer is plotted on scale "A" of Fig. 1. This value, in proper units of energy such as foot-pounds, denotes the air resistance against the pendulum, frictional loss in the bearings for the rod supporting the pendulum, as well as the loss of energy resulting in overcoming the inertia of the pointer. Without disturbing this setting of the pointer, another swing of the pendulum is made, the starting point for the second swing being the same starting point as that of the first swing. The new reading of the pointer thus obtained deviates but slightly from the first reading of the pointer, the difference being the amount of energy lost in the pendulum swing due to air resistance and friction alone, the energy required to overcome the inertia of the pointer being negligible. The second reading is marked off on scale "B".

The next swing, with the pointer at zero reading and origin of swing being the same as for the first two swings, is made with the test sample in the path of the pendulum. When the sample breaks due to the impact of the pendulum, the pointer on the scale indicates the energy left in the specimen, or, in other words, the energy absorbed by the specimen in breaking. This value of the energy consumed by the specimen in breaking is plotted on scale "C." The straight line 26 of arm 20 is adjusted to join the point plotted on scale "A" to the point plotted on scale "B." The arm 21 is then moved so that its straight edge 26, at right angles to scale "C" and passing through the point plotted thereon intersects the straight line joining the two points plotted on scales "A" and "B" respectively. The point of intersection of the two lines 26 of the arms 20 and 21 is read off the correction scale "D" by moving the transparent arm 12 so that the straight edge thereon is parallel to the lower edge of the board 10 and passes through said point of intersection. This correction value is subtracted from the original value obtained upon breakage of the test specimen, which was plotted on scale "C." The value thus obtained after subtraction is the final value denoting the amount of energy absorbed by the specimen during breakage.

The following is a specific example of the operation of the device: Using an impact-testing machine of the "Izod" type, a weight is allowed to fall from an initial starting point without the test specimen in position. A pointer, secured to the axis of the pendulum or swinging weight, rises in response to the maximum height of a single swing of the pendulum to give the reading .04. This value is marked on scale "A," and denotes the air resistance against the pendulum, frictional loss in the bearings for the rod supporting the pendulum, and the loss of energy resulting in overcoming the inertia of the pointer.

Without disturbing this setting of the pointer, another swing of the pendulum is made, the starting point for the second swing being the same as that of the first swing. The reading of the pointer thus obtained is .02, deviating from the first reading by the amount of energy lost in the pendulum swing due to air resistance and friction alone, the energy required to overcome the inertia of the pointer being negligible. This reading of .02 is marked off on scale "B."

The next swing, with the pointer at zero reading and origin of swing the same as for the first two swings, is made with the test sample in the path of the pendulum. When the sample breaks due to the impact of the pendulum, the pointer on the scale indicates .7, the value of the energy consumed by the specimen in breaking. This value of .7 is plotted on scale "C."

The line 26 of arm 20 is adjusted to join the point .04 plotted on scale "A" to the point .02 plotted on scale "B," as shown in Fig. 1. Arm 21 is then moved so that its line 26, at right angles to scale "C" and passing through the point .7 plotted thereon, intersects the line joining .04 on scale "A" and .02 on scale "B," as shown in Fig. 1. Line 26 of arm 12, which is parallel to the horizontal grid lines of the chart, is adjusted until it intersects the point of intersection of the line 26 of arms 20 and 21. This gives the correction value .03 on scale "D," as shown in Fig. 1. This correction value is subtracted from the original value obtained upon breakage of the test specimen, which was .7, to give the resultant .67, which is the final value denoting the amount of energy absorbed by the specimen during breakage.

Since many tests are made on many specimens, it is impractical to draw all the necessary lines on a single chart, especially if the number of experiments is relatively high, say ten or more. The drawing of too many lines entails much confusion and necessitates frequent replacement of charts on said chart-holder. The use of the present invention eliminates this unnecessary waste of time involved in drawing lines and replacing charts, not to mention the saving of said charts.

Where the value on the "A" scale is small relative the value on the "B" scale, arm 12 is adjusted to join the point plotted on scale "A" to the point plotted on scale "B." Arm 21 is then moved so that its line 26, at right angles to scale "C" and passing through the point plotted thereon, intersects the line joining the points plotted on scales "A" and "B." Arm 20 is then positioned parallel to the horizontal grid lines of the chart and adjusted until it intersects the point of intersection of the lines of arms 12 and 21. This gives a direct reading of the correction value on scale "D," and such value is subtracted from the original value obtained upon breakage of the test specimen to give the final value denoting the amount of energy absorbed by the specimen during breakage.

This invention can be readily applied to nomographs of every description, especially where four or more variables are involved on a single nomograph. Nomographs having four or more variables plotted on a single chart are common in fields such as engineering and statistics. If these charts are to be used often, it would be practical to secure them by any suitable means such as, for example, transparent tape, and use this chart holder.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A chart-holder comprising a support having a flat surface, a plurality of crossed transverse arms mounted slidably and adjustably thereon, and another arm mounted slidably upon said support, crossing said transverse arms, and constrained to move parallel to an edge of said surface only.

2. A chart-holder comprising a support having a flat surface, a plurality of crossed transverse arms mounted slidably and adjustably thereon, alignment means on said arms, and a third arm mounted slidably on said surface, crossing said transverse arms, said third arm being constrained to move parallel to an edge of said surface only.

3. A chart-holder comprising a support having a flat surface, a plurality of parallel slots in said support, a plurality of crossed transverse arms mounted resiliently and slidably in said parallel slots through longitudinal slots in said arms, and a third arm mounted slidably on said support, crossing said transverse arms, said third arm having means constraining it to move parallel to said parallel slots and normal to an edge of said support.

4. A chart-holder comprising a support having a flat surface, a plurality of parallel slots in said support, a plurality of crossed transverse arms mounted resiliently and slidably in said parallel slots near the extremities of said arms, alignment means on said arms, and a third arm mounted slidably on said support, crossing said transverse arms, said third arm having means constraining it to move parallel to said parallel slots and normal to an edge of said support.

5. A chart-holder comprising a support having a flat surface, a plurality of slots in said support, a first arm mounted resiliently and slidably in said slots and adapted to be positioned within a range from normal to at least one of said slots to an acute angle thereto, a second arm mounted resiliently and slidably in said slots, crossing said first arm, and adapted to be positioned within a range from normal to at least one of said slots to an acute angle thereto, and a third arm having mounting means whereby said arm is carried resiliently and slidably on said support, crossing said first and second arms, said means constraining said third arm to move parallel to at least one of said slots.

6. A chart-holder comprising a support having a flat surface, a plurality of parallel slots in said support, a first arm mounted resiliently and slidably in said slots and adapted to be positioned within a range from normal to said slots to an acute angle thereto, a second arm mounted resiliently and slidably in said slots and crossing said first arm, and a third arm mounted resiliently and slidably on said support, crossing said first and second arms, said third arm carrying means constraining it to move parallel to said slots.

ALFRED A. BOEHM, Jr.

REFERENCES CITED

The following references are of record in the file of this patent:

UNITED STATES PATENTS

| Number | Name | Date |
|---|---|---|
| 429,586 | Sajous | June 3, 1890 |
| 1,074,439 | Kincaid | Sept. 30, 1913 |
| 1,157,043 | Richmond | Oct. 19, 1915 |
| 1,503,299 | Canon | July 29, 1924 |
| 2,109,065 | Haselton | Feb. 22, 1938 |
| 2,296,799 | Rosin | Sept. 22, 1942 |
| 2,309,675 | Scholomann et al. | Feb. 2, 1943 |
| 2,403,614 | Ross | July 9, 1946 |

FOREIGN PATENTS

| Number | Country | Date |
|---|---|---|
| 383,822 | Germany | Oct. 18, 1923 |